(12) United States Patent
Song et al.

(10) Patent No.: US 7,771,851 B2
(45) Date of Patent: Aug. 10, 2010

(54) GYPSUM-CONTAINING PRODUCTS CONTAINING ALPHA HEMIHYDRATE

(75) Inventors: Weixin David Song, Gurnee, IL (US); Qiang Yu, Grayslake, IL (US); Qiangxia Liu, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 883 days.

(21) Appl. No.: 11/213,529

(22) Filed: Aug. 26, 2005

(65) Prior Publication Data
US 2007/0048549 A1     Mar. 1, 2007

(51) Int. Cl.
B32B 13/00 (2006.01)
C04B 11/00 (2006.01)
C04B 28/14 (2006.01)

(52) U.S. Cl. .................. 428/703; 106/772; 423/555
(58) Field of Classification Search .................. 428/703
See application file for complete search history.

(56) References Cited

U.S. PATENT DOCUMENTS

| | | | |
|---|---|---|---|
| 3,359,146 A | 12/1967 | Lane et al. | |
| 3,573,947 A | 4/1971 | Kinkade et al. | |
| 3,797,758 A | 3/1974 | Cherdron et al. | |
| 3,913,571 A * | 10/1975 | Bayer et al. | 602/8 |
| 4,184,887 A | 1/1980 | Lange et al. | |
| 4,234,345 A | 11/1980 | Fässle | |
| 4,237,260 A | 12/1980 | Lange et al. | |
| 4,309,391 A * | 1/1982 | O'Neill | 423/172 |
| 4,965,031 A | 10/1990 | Conroy | |
| 5,041,333 A | 8/1991 | Conroy | |
| 5,093,093 A * | 3/1992 | Koslowski | 423/171 |
| 5,227,100 A * | 7/1993 | Koslowski et al. | 264/414 |
| 5,746,822 A | 5/1998 | Espinoza et al. | |
| 6,241,815 B1 * | 6/2001 | Bonen | 106/735 |
| 6,342,284 B1 | 1/2002 | Yu et al. | |
| 6,387,172 B1 | 5/2002 | Yu et al. | |
| 6,406,537 B1 * | 6/2002 | Immordino | 106/778 |
| 6,409,825 B1 | 6/2002 | Yu et al. | |
| 6,481,171 B2 | 11/2002 | Yu et al. | |
| 6,632,550 B1 | 10/2003 | Yu et al. | |
| 6,783,587 B2 * | 8/2004 | Sethuraman et al. | 106/674 |

(Continued)

FOREIGN PATENT DOCUMENTS

WO    WO03/082766 A1 * 10/2003

OTHER PUBLICATIONS

ASTM Standard C472, "Standard Test Methods for Physical Testing of Gypsum, Gypsum Plasters and Gypsum Concrete," *Annual Book of ASTM Standards*, vol. 04.01, Section 4, 245-252 (1998).

(Continued)

*Primary Examiner*—David R Sample
*Assistant Examiner*—Nicole T Gugliotta
(74) *Attorney, Agent, or Firm*—Drinker Biddle & Reath LLP

(57) ABSTRACT

The invention provides gypsum wallboard, made from gypsum-containing slurries having outstanding hydration rate characteristics comprising alpha-hemihydrate ground to a particular particle size distribution range and having a Blaine surface area in the range from about 3100 cm$^2$/g to about 9000 cm$^2$/g, alone or in combination with beta-hemihydrate.

25 Claims, 7 Drawing Sheets

U.S. PATENT DOCUMENTS

| | | | |
|---|---|---|---|
| 6,800,131 | B2 | 10/2004 | Yu et al. |
| 6,815,049 | B2 | 11/2004 | Veeramasuneni et al. |
| 6,822,033 | B2 | 11/2004 | Yu et al. |
| 6,964,704 | B2 * | 11/2005 | Cox et al. .................. 106/772 |
| 2003/0084980 | A1 * | 5/2003 | Seufert et al. ................ 156/39 |
| 2005/0150427 | A1 * | 7/2005 | Liu et al. .............. 106/287.32 |
| 2005/0250888 | A1 * | 11/2005 | Lettkeman et al. ......... 524/200 |
| 2006/0029785 | A1 * | 2/2006 | Wang et al. ............. 428/292.1 |
| 2006/0150868 | A1 | 7/2006 | Spickemann et al. |
| 2006/0280899 | A1 * | 12/2006 | Liu et al. .................... 428/70 |
| 2007/0022913 | A1 * | 2/2007 | Wang et al. ................ 106/697 |

OTHER PUBLICATIONS

ASTM Standard C473, "Standard Test Methods for Physical Testing of Gypsum Products," *Annual Book of ASTM Standards*, vol. 04.01, Section 4, 253-263 (1998).

USG Research Center, "Accelerating the hydration of calcium sulfate hemihydrate via high energy mixing," Blaine, Steven; Materials and Structures, vol. 30, Jul. 97; pp. 362-365.

Ullmann's Encyclopedia of Industrial Chemistry; 5th Ed.; vol. A4; "Calcium Sulfate," Wirsching, Franz; pp. 1, 15.

* cited by examiner

All board formulations included 1% naphthalenesulfonate dispersant and 0.3% sodium trimetaphosphate.
All boards were prepared with Caraustar paper.

GYPSUM-CONTAINING PRODUCTS CONTAINING ALPHA HEMIHYDRATE

FIELD OF THE INVENTION

This invention pertains to the use of alpha-hemihydrate in making gypsum-based products. This invention also pertains to a method of reducing water requirements in slurries used to make gypsum-containing products and more particularly to gypsum slurries containing alpha-hemihydrate, alone or in combination with beta-hemihydrate, to make gypsum wallboard. It also pertains to a method of increasing dry strength of gypsum wallboard using alpha-hemihydrate.

BACKGROUND OF THE INVENTION

Certain properties of gypsum (calcium sulfate dihydrate) make it very popular for use in making industrial and building products, particularly gypsum wallboard. Gypsum is a plentiful and generally inexpensive raw material which, through a process of dehydration (or calcination) and rehydration, can be cast, molded or otherwise formed into useful shapes. The base material from which gypsum wallboard and other gypsum products are manufactured is the hemihydrate form of calcium sulfate ($CaSO_4 \cdot \frac{1}{2}H_2O$), commonly termed "stucco," which is produced by heat conversion of the dihydrate form of calcium sulfate ($CaSO_4 \cdot 2H_2O$), in which $1\frac{1}{2}$ water molecules been removed. After rehydration, the hemihydrate dissolves, gypsum crystals precipitate, and the crystal mass sets and becomes solid, providing a set gypsum material.

There are two categories of gypsum, alpha-hemihydrate and beta-hemihydrate, which are produced by different calcinations methods. Alpha-hemihydrate (or alpha gypsum) is calcined under pressure. Beta-hemihydrate (or beta gypsum) is made by calcining in a kettle at atmospheric pressure. The stucco used in making gypsum wallboard is exclusively in the beta-hemihydrate form. Alpha-hemihydrate is not used commercially in the production of gypsum wallboard primarily due to its slower hydration rate compared to beta-hemihydrate (which would require slower line speed), and the lower strength characteristics obtained when commonly available alpha-hemihydrate is used at densities common to wallboard manufacturing. However, it would be advantageous to be able to use alpha-hemihydrate or blends of alpha-hemihydrate and beta-hemihydrate in making gypsum wallboard, since alpha-hemihydrate is a readily available raw material having several unique useful properties. These unique useful properties include substantially lower water demand to produce required fluidity than beta-hemihydrate and resultant set cast higher density, higher strength, and higher surface hardness.

It is necessary to use substantial amounts of water in gypsum slurries in order to ensure proper flowability of the slurry. Unfortunately, most of this water must eventually be driven off by heating, which is expensive due to the high cost of the fuels used in the heating process. The heating step is also time-consuming. This means that if alpha-hemihydrate could be used in making wallboard it would substantially reduce the water demand and hence the expense and time required to produce the wallboard.

It now has been found that when alpha-hemihydrate is ground to produce particles of alpha-hemihydrate as described below, its hydration rate can be substantially improved without losing any of its other desirable properties, including its low water demand. Indeed, it has been found that alpha-hemihydrate hydration rates can be achieved in slurries used to make wallboard that are fully acceptable for use in production of gypsum wallboard.

BRIEF SUMMARY OF THE INVENTION

In one embodiment, the invention constitutes gypsum wallboard comprising a set gypsum composition between two substantially parallel cover sheets, the set gypsum composition made using a gypsum-containing slurry of water, and ground alpha-hemihydrate. The alpha-hemihydrate has a particle size distribution within the following range:

d (0.1)=about 3μ-5μ,
d (0.5)=about 14μ-50μ,
d (0.9)=about 40μ-100μ, and a Blaine surface area in the range from about 3100 $cm^2/g$ to about 9000 $cm^2/g$. Other conventional ingredients will also be used in the slurry including, as appropriate, dispersants (such as naphthalenesulfonates), strength additives (such as trimetaphosphates), accelerators, binders, starch, paper fiber, glass fiber, and other known ingredients. A soap foam can be added to reduce the density of the final gypsum wallboard product.

In another embodiment the invention constitutes a method of making gypsum wallboard by mixing a gypsum-containing slurry comprising water, and ground alpha-hemihydrate having a particle size distribution within the following range:

d (0.1)=about 3μ-5μ,
d (0.5)=about 14μ-50μ,
d (0.9)=about 40μ-100μ, and a Blaine surface area in the range from about 3100 $cm^2/g$ to about 9000 $cm^2/g$. The resulting gypsum-containing slurry is deposited on a first paper cover sheet, and a second paper cover sheet is placed over the deposited slurry to form a gypsum wallboard. The gypsum wallboard is cut after the gypsum-containing slurry has hardened sufficiently for cutting, and the resulting gypsum wallboard is dried. Other conventional ingredients will also be used in the slurry including, as appropriate, dispersants (such as naphthalenesulfonates), strength additives (such as trimetaphosphates), accelerators, binders, starch, paper fiber, glass fiber, and other known ingredients. A soap foam can be added to reduce the density of the final gypsum wallboard product.

In yet another embodiment the invention comprises gypsum wallboard and slurries used in making wallboard in which some or all of the stucco component is ground alpha-hemihydrate in the particle size ranges discussed above. Where the stucco component is not all alpha-hemihydrate the other stucco component will be beta-hemihydrate. The water demand in such slurries for making gypsum wallboard is further reduced by introducing into the slurry about 0.12-0.4% by weight based on the weight of dry stucco of a trimetaphosphate salt along with a naphthalenesulfonate dispersant in an amount of about 0.5-2.5% by weight based on the weight of dry stucco in the formulation. Other conventional ingredients will also be used in the slurry including, as appropriate, accelerators, binders, starch, paper fiber, glass fiber, and other known ingredients. A soap foam can be added to reduce the density of the final gypsum wallboard product.

DETAILED DESCRIPTION OF THE INVENTION

Figure 1:
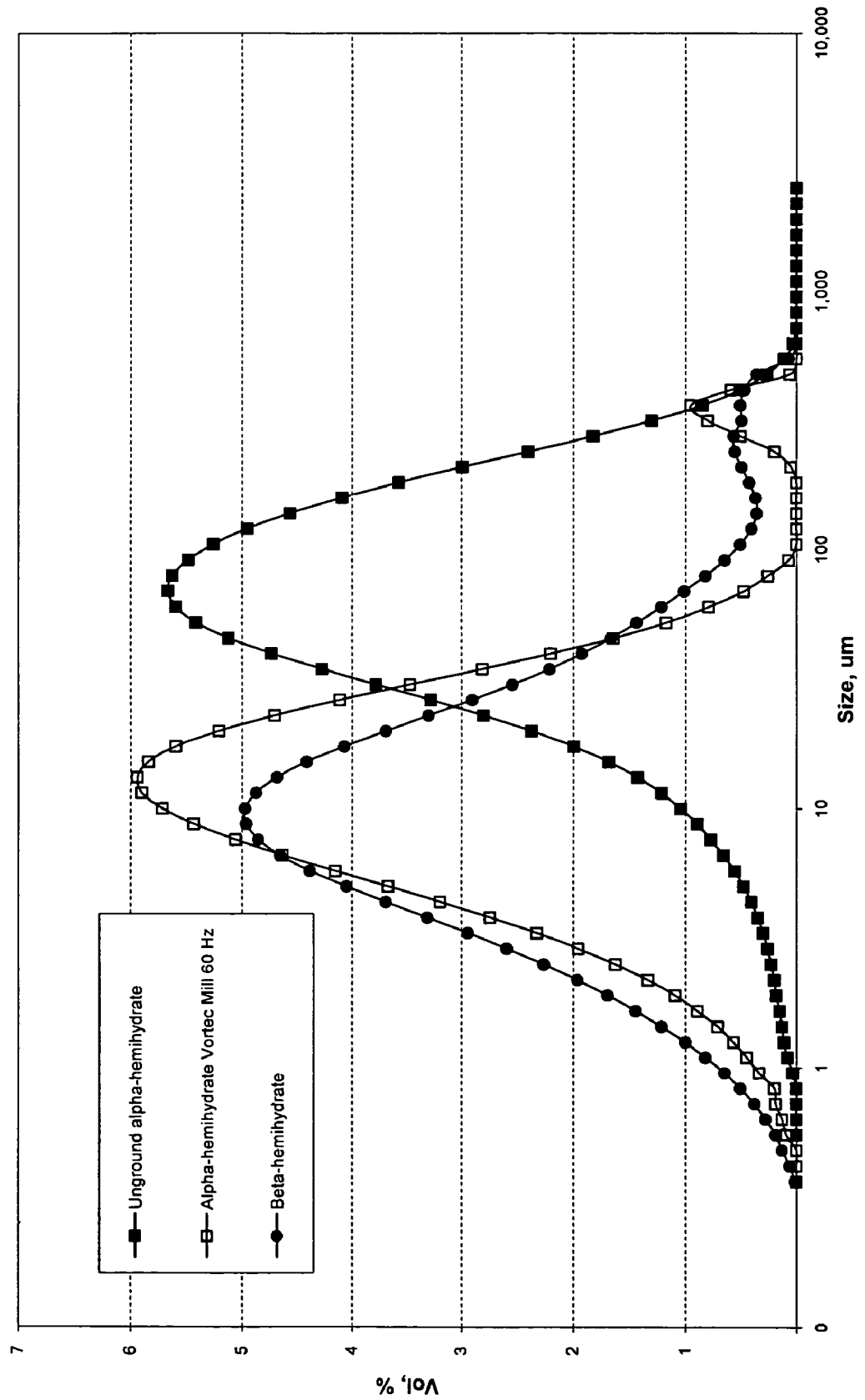
FIG. 1 is a graph depicting the particle size distribution of alpha-hemihydrate and beta-hemihydrate samples in one embodiment of the invention.

In the present inventions it unexpectedly has been found that gypsum wallboard can be obtained using alpha-hemihydrate ground to specific particle size ranges. Any suitable standard commercial grinding equipment can be used for this purpose. Grinding can be achieved by using a mechanical milling means, for example, such as an impact mill or a ball mill.

Particle size distribution ("PSD") of the alpha-hemihydrate is a critical feature of the invention and should lie within the following range:

d (0.1)=about 3μ-5μ
d (0.5)=about 14μ-50μ
d (0.9)=about 40μ-100μ.

The particle size range can be determined on a Malvern Instruments Model Mastercizer 2000 or other commercially available measuring instrument.

The above values represent percentages by volume, that is: d (0.1) indicates that 10% of the total volume of particles have a diameter less than or equal to about 3μ-5μ, while the remaining 90% has a diameter greater than 3μ-5μ; d (0.5) indicates that 50% of the total volume of particles have a diameter less than or equal to about 14μ-50μ, while 50% has a diameter greater than 14μ-50μ; and d (0.9) indicates that 90% of the total volume of particles have a diameter less than or equal to about 40μ-100μ, while the remaining 10% has a diameter greater than 40μ-100μ.

Preferably, the PSD will lie within the following range:

d (0.1)=about 3μ-5μ
d (0.5)=about 14μ-20μ
d (0.9)=about 40μ-50μ.

One preferred alpha-hemihydrate has a PSD of: d (0.1)=5μ, d (0.5)=50μ, d (0.9)=100μ. Another more preferred alpha-hemihydrate has a PSD of: d (0.1)=5μ, d (0.5)=20μ, d (0.9)=50μ. A yet more preferred alpha-hemihydrate has a PSD of: d (0.1)=3μ, d (0.5)=14μ, d (0.9)=40μ. A particularly preferred alpha-hemihydrate has a PSD of: d (0.1)=3μ, d (0.5)=14.1μ, d (0.9)=45.9μ.

Also, the Blaine surface area of the ground particles should be concomitantly about 3100-9000 $cm^2/g$, preferably about 3500-6000 $cm^2/g$ and most preferably about 3900 $cm^2/g$. The Blaine surface area can be determined on an instrument available from Humboldt Manufacturing Co., Norridge, Ill., or other commercially available measuring instrument.

Based on the same PSD analysis, the PSD of commercial grade beta-hemihydrate is: d (0.1)=2.1μ, d (0.5)=9.2μ, d (0.9)=49.1μ. Commercial grade ground alpha-hemihydrate typically has the following PSD: d (0.1)=4.4μ, d (0.5)=36.8μ, d (0.9)=169μ, while unground alpha-hemihydrate has the following PSD: d (0.1)=17.4μ, d (0.5)=64.5μ, d (0.9)=162.8μ. Commercial grade ground alpha-hemihydrate typically has a Blaine surface area of about 2700 $cm^2/g$. These values all fall outside of the useful range in the embodiments of the present invention.

In embodiments where alpha-hemihydrate of the invention is used in combination with beta-hemihydrate, the alpha-hemihydrate and beta-hemihydrate preferably will be blended before introduction into the slurry. Any suitable standard commercial blending equipment, or similar apparatus, can be used for this purpose. For experimental purposes, for example, fine ground alpha-hemihydrate and beta-hemihydrate can be added to a plastic bag, which is then sealed and shaken manually to prepare the blend. A particularly preferred blend of alpha-hemihydrate and beta-hemihydrate is 50:50 (w/w).

Water/stucco (w/s) ratio, or "WSR," is an important economic parameter, since excess water must eventually be driven off by heating, which is expensive due to the high cost of the fuels used in the heating process. It is advantageous for the amount of process water, and consequently WSR, to be kept low. In the embodiments of the present invention, WSR can range from about 0.2 to about 1.0. In a preferred embodiment, WSR can range from about 0.4 to about 0.5, which range demonstrates a substantially lower water demand. In addition, it has been found that gypsum slurries made using alpha-hemihydrate in accordance with the present invention maintain excellent fluidity at very low WSR, from about 0.2 to about 0.3, for example. Gypsum wallboard made using the slurries also exhibit excellent compressive strength.

The combination of a minimum of at least about 0.12-0.4% by weight of trimetaphosphate salt and from about 0.5%-2.5% by weight naphthalenesulfonate dispersant (both based on the weight of dry stucco used in the gypsum slurry) unexpectedly and significantly increases the fluidity of the gypsum slurry beyond the already significant improvement in fluidity achieved using alpha-hemihydrate in accordance with the present invention. This further reduces the amount of water required to produce a gypsum slurry with sufficient flowability to be used in making gypsum wallboard. The level of trimetaphosphate salt, which is at least about twice that of standard formulations (as sodium trimetaphosphate), is believed to boost the dispersant activity of the naphthalenesulfonate dispersant. It should be noted that in all embodiments of the present invention, a combination of both naphthalenesulfonate dispersant and water-soluble metaphosphate or polyphosphate (and preferably a water-soluble trimetaphosphate) must be used.

The naphthalenesulfonate dispersants used in the present invention include polynaphthalenesulfonic acid and its salts (polynaphthalenesulfonates) and derivatives, which are condensation products of naphthalenesulfonic acids and formaldehyde. Particularly desirable polynaphthalenesulfonates include sodium and calcium naphthalenesulfonate. The average molecular weight of the naphthalenesulfonates can range from about 3,000 to 20,000, although it is preferred that the molecular weight be about 8,000 to 10,000. A higher molecular weight dispersant has higher viscosity, and generates a higher water demand in the formulation. Useful naphthalenesulfonates include LOMAR D, available from Henkel Corporation, DILOFLO, available from GEO Specialty Chemicals, Cleveland, Ohio, and DAXAD, available from Hampshire Chemical Corp., Lexington, Mass. It is preferred that the naphthalenesulfonates be used in the form of an aqueous solution, for example, in the range of about 40-45% by weight solids content.

The polynaphthalenesulfonates useful in the present invention have the general structure (I):

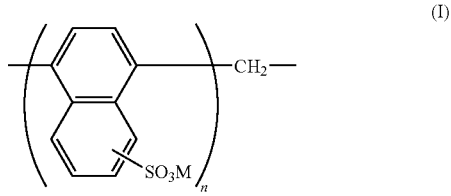

wherein n is >2, and wherein M is sodium, potassium, calcium, and the like.

The naphthalenesulfonate dispersant must be used in a range of from about 0.5% to about 2.5% by weight based on the weight of dry stucco used in the gypsum composite formulation. A preferred range of naphthalenesulfonate dispersant is from about 0.5% to about 1.5% by weight based on the weight of dry stucco, a more preferred range from about 0.7% to about 1.5% by weight based on the weight of dry stucco, and a most preferred range from about 0.7% to about 1.2% by weight based on the weight of dry stucco.

Any suitable water-soluble metaphosphate or polyphosphate can be used in accordance with the present invention. It is preferred that a trimetaphosphate salt be used, including double salts, that is trimetaphosphate salts having two cations. Particularly useful trimetaphosphate salts include sodium trimetaphosphate, potassium trimetaphosphate, calcium trimetaphosphate, sodium calcium trimetaphosphate, lithium trimetaphosphate, ammonium trimetaphosphate, and the like, or combinations thereof. A preferred trimetaphosphate salt is sodium trimetaphosphate. It is preferred to use the trimetaphosphate salt as an aqueous solution, for example, in the range of about 10-15% by weight solids content. Other cyclic or acyclic polyphosphates can also be used, as described in U.S. Pat. No. 6,409,825 to Yu et al., herein incorporated by reference.

Sodium trimetaphosphate is a known additive in gypsum-containing compositions, although it is generally used in a range of from about 0.05% to about 0.08% by weight based on the weight of dry stucco used in the gypsum slurry. In embodiments of the present invention, sodium trimetaphosphate (or other water-soluble metaphosphate or polyphosphate) must be present in the range of from about 0.12% to about 0.4% by weight based on the weight of dry stucco used in the gypsum composite formulation. A preferred range of sodium trimetaphosphate (or other water-soluble metaphosphate or polyphosphate) is from about 0.12% to about 0.3% by weight based on the weight of dry stucco used in the gypsum composite formulation.

Starches, including pregelatinized starch in particular, can be used in gypsum-containing slurries prepared in accordance with the present invention. A preferred pregelatinized starch is pregelatinized corn starch, for example pregelatinized corn flour available from Bunge, St. Louis, Mo., having the following typical analysis: moisture 7.5%, protein 8.0%, oil 0.5%, crude fiber 0.5%, ash 0.3%; having a green strength of 0.48 psi; and having a loose bulk density of 35.0 lb/ft$^3$. Pregelatinized corn starch can be used in an amount up to about 10% by weight, based on the weight of dry stucco used in the gypsum-containing slurry.

Other useful starches include acid-modified starches, such as acid-modified corn flour, available as HI-BOND from Bunge, St. Louis, Mo. This starch has the following typical analysis: moisture 10.0%, oil 1.4%, solubles 17.0%, alkaline fluidity 98.0%, loose bulk density 30 lb/ft$^3$, and a 20% slurry producing a pH of 4.3. Another useful starch is non-pregelatinized wheat starch, such as ECOSOL-45, available from ADM/Ogilvie, Montreal, Quebec, Canada, having maximum solubles 25.0%.

A further unexpected result may be achieved with the present invention when the naphthalenesulfonate dispersant trimetaphosphate salt combination is combined with pregelatinized corn starch, and optionally, paper fiber or glass fiber. Gypsum wallboard made from formulations containing these three ingredients have increased strength and reduced weight, and are more economically desirable due to the reduced water requirements in their manufacture.

Accelerators can be used in the gypsum-containing compositions of the present invention, for example, wet gypsum accelerator (WGA), as described in U.S. Pat. No. 6,409,825 to Yu et al., herein incorporated by reference. One desirable heat resistant accelerator (HRA) can be made from the dry grinding of landplaster (calcium sulfate dihydrate). Small amounts of additives (normally about 5% by weight) such as sugar, dextrose, boric acid, and starch can be used to make this HRA. Sugar or dextrose are currently preferred. Another useful accelerator is "climate stabilized accelerator" or "climate stable accelerator," (CSA) as described in U.S. Pat. No. 3,573,947, herein incorporated by reference.

Gypsum wallboard made according to the embodiments of the present invention includes cover sheets or surface sheets, between which a set gypsum core is formed from a gypsum-containing slurry. In accordance with the invention, the gypsum-containing slurries will include ground alpha-hemihydrate with particles sizes as described above, or blends of such alpha-hemihydrate and beta-hemihydrate. The set gypsum-containing core material is sandwiched between two substantially parallel cover sheets, for example paper cover sheets. Various types of paper cover sheets are known in the art and all such types of paper cover sheets may be used in the present invention. Cover sheets comprising mats of glass or polymer fibers may also be used.

The following examples further illustrate the invention. They should not be construed as in any way limiting the scope of the invention.

Figure 2:
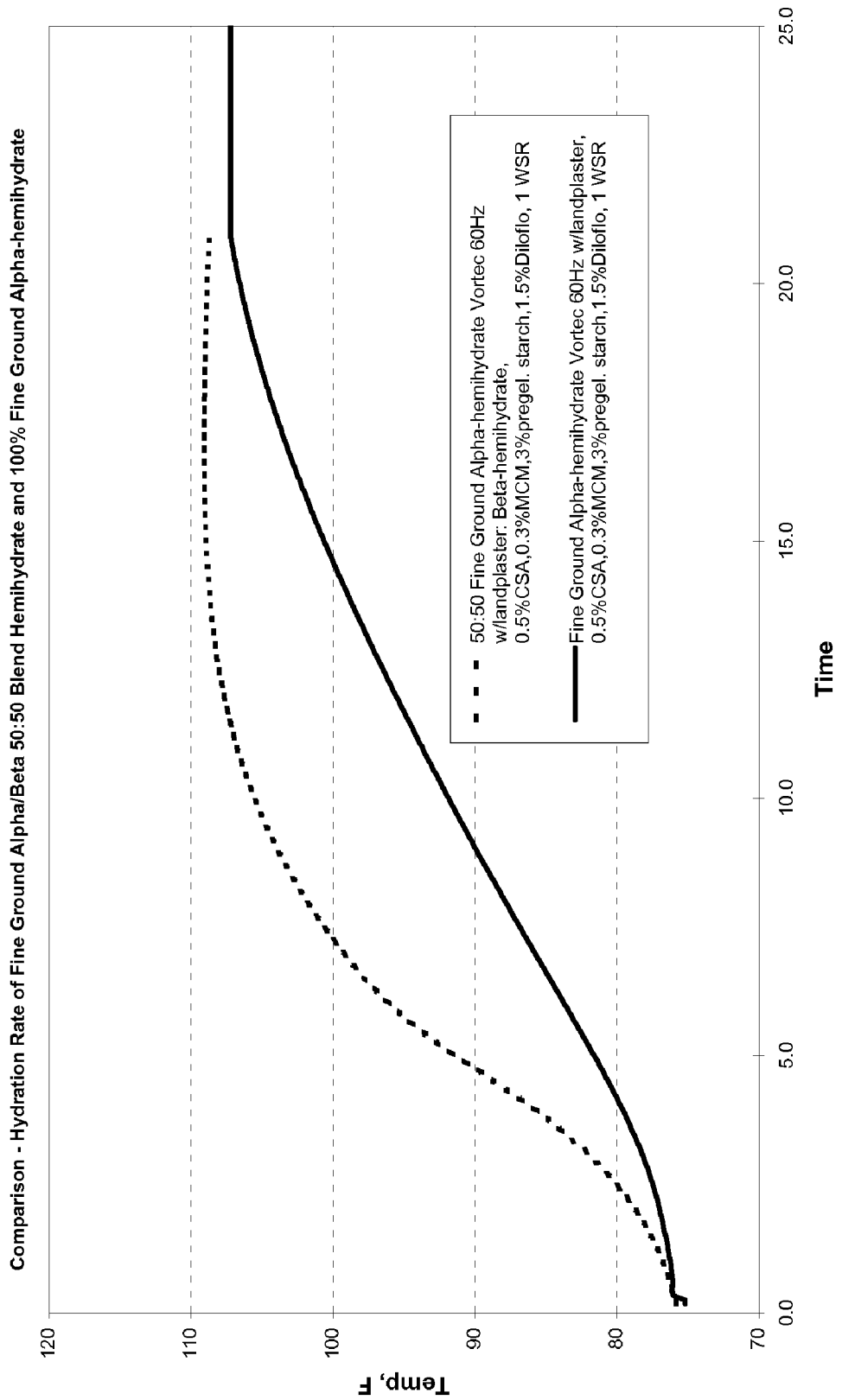
FIG. 2 is a graph depicting the hydration rate of a 50:50 blend of fine ground alpha-hemihydrate and beta-hemihydrate and the hydration rate of 100% alpha-hemihydrate.

Calcination technology provides an economical way of producing alpha-hemihydrate. However, commercial grade, plant produced alpha-hemihydrate cannot be easily hydrated in a manner that is required in wallboard production. It has been found that grinding the regular alpha-hemihydrate, as shown in Example 1, to a desired particle size distribution ("PSD"), as shown in FIG. 1, speeds up the hydration process, as shown in FIG. 2 and Table 1 below.

Example 1

Preparation of Fine Ground Alpha-Hemihydrate

Unground alpha-hemihydrate is ground with a Vortec M-1 impact mill, available from Vortec Industries of Long Beach, Calif., at 60 Hz speed setting@1.8 lb./min. The PSD of raw material and fine ground material is shown in FIG. 1. The resulting fine ground alpha-hemihydrate is blended with beta-hemihydrate at a 50:50 (wt/wt) ratio by labscale twin shell mixer.

As shown in FIG. 1, the PSD of fine ground alpha-hemihydrate closely resembles the PSD of beta-hemihydrate. Unground alpha-hemihydrate is also shown for comparison.

As shown in FIG. 2, the hydration rate of a 50:50 blend of fine ground alpha-hemihydrate and beta-hemihydrate is reduced substantially from 100% alpha-hemihydrate, even though the 100% alpha-hemihydrate sample has also been fine ground. Hydration rate was determined according to the test procedure found in Example 2 of U.S. Pat. No. 6,815,049 to Veeramasuneni et al., herein incorporated by reference.

Table 1 demonstrates the improvement in hydration time for exemplary blends.

TABLE 1

|  | Time to 50% Hydration, min. | Time to 98% Hydration, min. |
| --- | --- | --- |
| Alpha component of 50:50 Stucco sample |  |  |
| Regular unground alpha-hemihydrate w/0.5% CSA and 0.5% Potash (or sodium bisulfate) | 2.5-3.5 | >10 |
| 33 Hz Vortec ground alpha w/0.5% CSA | 3.75 | 11.67 |
| 60 Hz Vortec fine ground alpha w/0.5% CSA | 4 | 9.67 |
| 60 Hz Vortec fine ground alpha w/0.5% CSA and 0.5% Potash | 3.25 | 8.83 |
| 60 Hz Vortec fine ground alpha w/1% landplaster and 0.5% Potash Conventional Wallboard Slurry | 3.50 | 7.75 |
| No alpha (only Beta stucco w/WGA) | 3-4 | 5-6.5 |

All 50:50 blends included 1.0% LOMAR D by weight.

As shown in Table 1, the time to 98% hydration (kiln) was reduced from about 12 min. to 8.8 minutes as blends were optimized. In fact, when the fine ground alpha-hemihydrate included uncalcined gypsum ($CaSO_4.2H_2O$, i.e. "landplaster"), the hydration was even faster at 7.8 min. Therefore, fine grinding of the alpha-hemihydrate solves the issue of slow hydration rate.

Example 2

Compressive Strength of Alpha/Beta Blends

Figure 3:
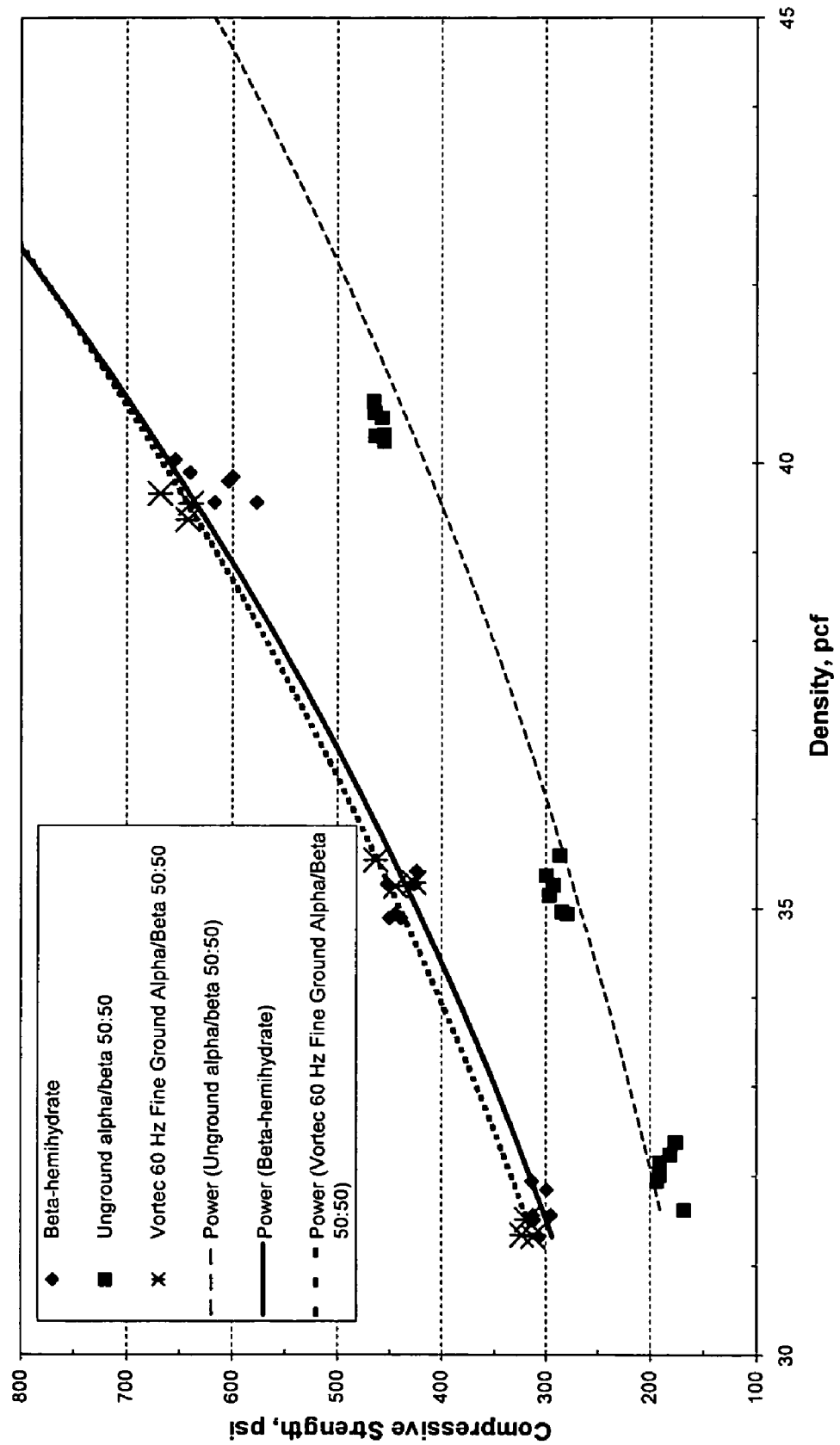
FIG. 3 is a graph depicting compressive strength of a 50:50 (w/w) blend of fine ground alpha-hemihydrate and beta-hemihydrate and compressive strength of 100% beta-hemihydrate.

With reference to FIG. 3, a 50:50 (w/w) blend of fine ground alpha-hemihydrate and beta-hemihydrate is shown to be generally equivalent in bench cube strength to 100% beta-hemihydrate. Compressive strength in psi, as reported in FIG. 1, was determined using neat stucco cubes made with water and stucco only (no foam) at varying densities in pounds per cubic foot (pcf). A 50:50 (w/w) blend of unground alpha-hemihydrate and beta-hemihydrate yielded poor strength results.

Example 3

Sample Gypsum Slurry Formulation

Gypsum slurry formulations are shown in Table 2 below. All values in Table 2 are expressed as weight percent based on the total weight of dry stucco.

TABLE 2

| Component | Formulation A, wt. % | Formulation B, wt. % |
| --- | --- | --- |
| 50:50 (w/w) blend of fine ground alpha-hemihydrate and beta-hemihydrate | 100 | 100 |
| sodium trimetaphosphate | 0.30 | 0.30 |
| Dispersant (naphthalenesulfonate) | 0.5 | 2.5 |
| Pregelatinized starch | 1.0 | 3.0 |
| climate stable accelerator (CSA) | 0.5 | 0.5 |
| Water/Stucco ratio | 0.5 | 0.5 |

Example 4

Effect of Formulation B on Water Demand

Figure 4:
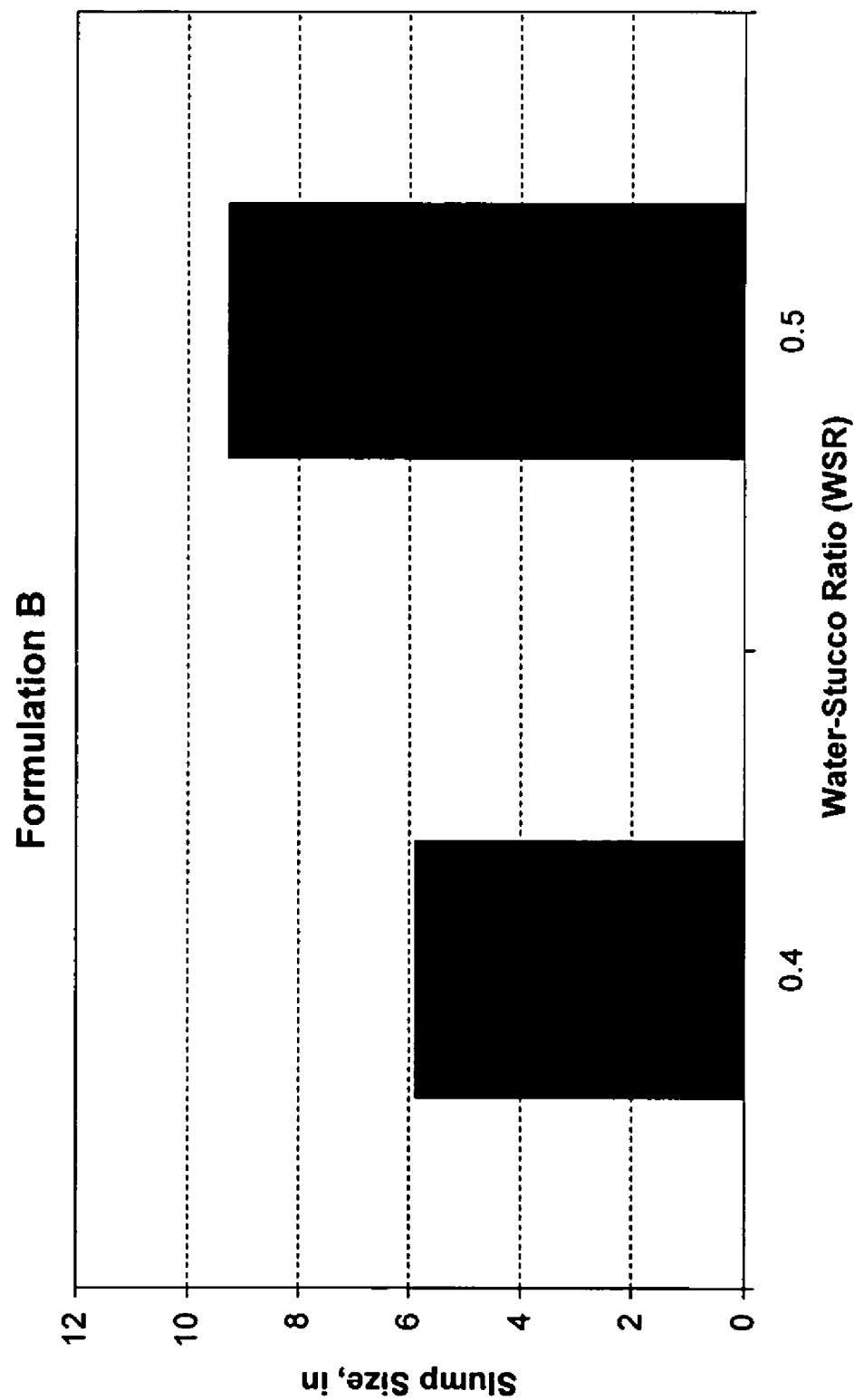
FIG. 4 is a bar graph depicting slump size as a measure of the fluidity of a gypsum-containing slurry formulation (Formulation B) in one embodiment of the present invention.

As shown in Table 2, high levels of trimetaphosphate salt and starch, as in Formulation B, were used to prepare gypsum-containing slurries. Slurry compositions such as Formulation B were found to have excellent fluidity at low WSR. As shown in FIG. 4, water demand was held substantially low using, for example, Formulation B. In order to measure fluidity in the slurry, a slump test was performed as follows.

Slump test. This test was performed using gypsum board core slurry at the mixer. The test was performed on a 12×12 inch Plexiglass plate so that slurry diameter can be measured without waiting for the slurry to set. Slurry was drawn from as close to the mixer as possible. A 2 inch by 4 inch smooth-walled brass or PVC cylinder mold was quickly filled with test slurry sample, and any overflow leveled off. The cylinder mold was then lifted rapidly straight up to give a gypsum patty. The diameter of the gypsum patty was measured. The resultant gypsum patty will be in the range of about 5 to 10 inches in diameter. This test was repeated until the results of three consecutive tests were within ⅛ inch, and this value was then recorded as slump diameter (slump size). The entire test procedure should not take more than 15 seconds to perform.

Example 5

Effect of Formulation A on Compressive Strength

Figure 5:
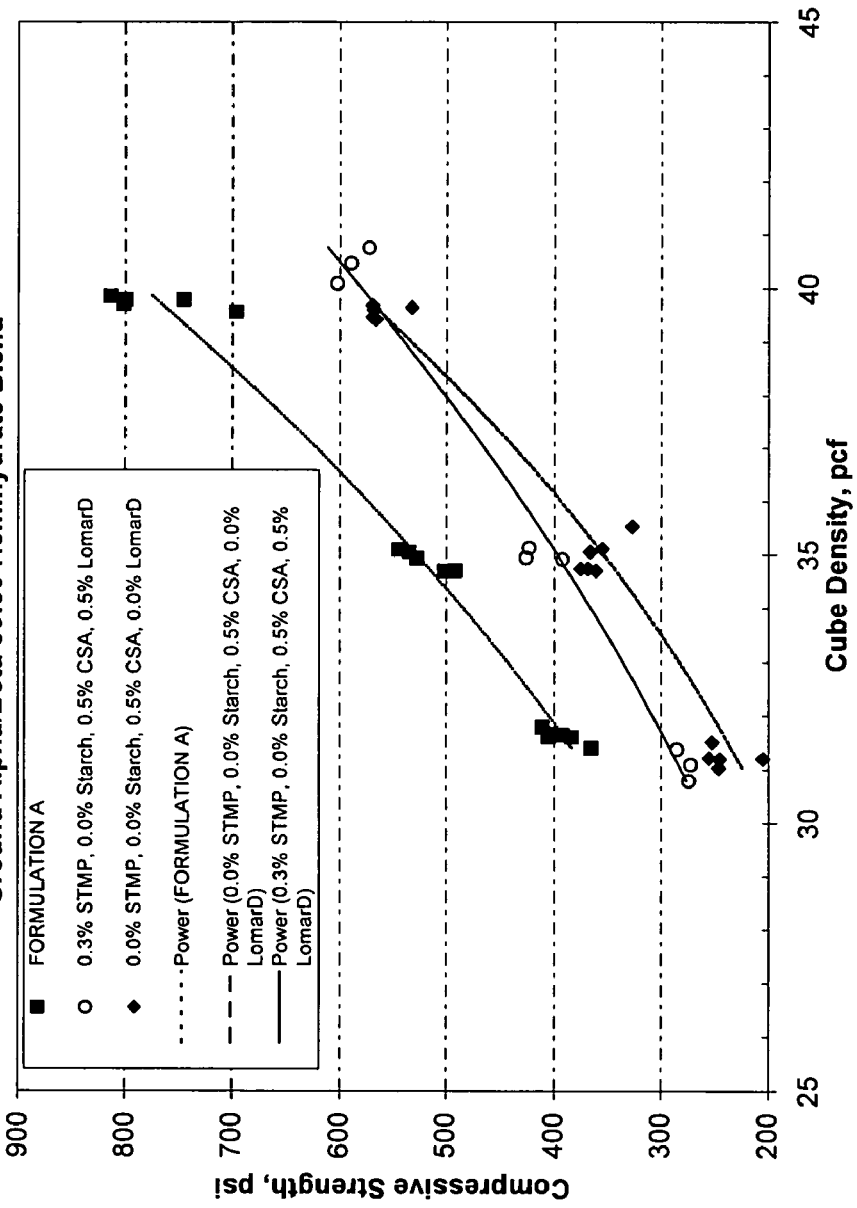
FIG. 5 is a graph depicting compressive strength of gypsum-containing slurry formulation (Formulation A) in one embodiment of the present invention.

Slurry compositions such as Formulation A (Table 2) were found to exhibit superior compressive strengths when used in cube tests. As shown in FIG. 5, compressive strengths at varied cube densities were at least about 10% greater when Formulation A was used, in comparison to tests having no starch or no starch and no dispersant. It should be stressed that naphthalenesulfonate dispersant is always needed in order to achieve a low WSR in the slurry.

Compressive strength was determined according to ASTM C-472, and in accordance with U.S. Pat. No. 6,815,049 to Veeramasuneni et al., herein incorporated by reference.

Example 6

Nail Pull Tests of Wallboard Prepared with 50:50 Blend Fine Ground Alpha-Hemihydrate and Beta-Hemihydrate Sample gypsum wallboards were prepared in accordance with U.S. Pat. No. 6,342,284 to Yu et al. and U.S. Pat. No.

6,632,550 to Yu et al., herein incorporated by reference. This includes the separate generation of foam and introduction of the foam into the slurry of the other ingredients as described in Example 5 of these patents.

Figure 6:
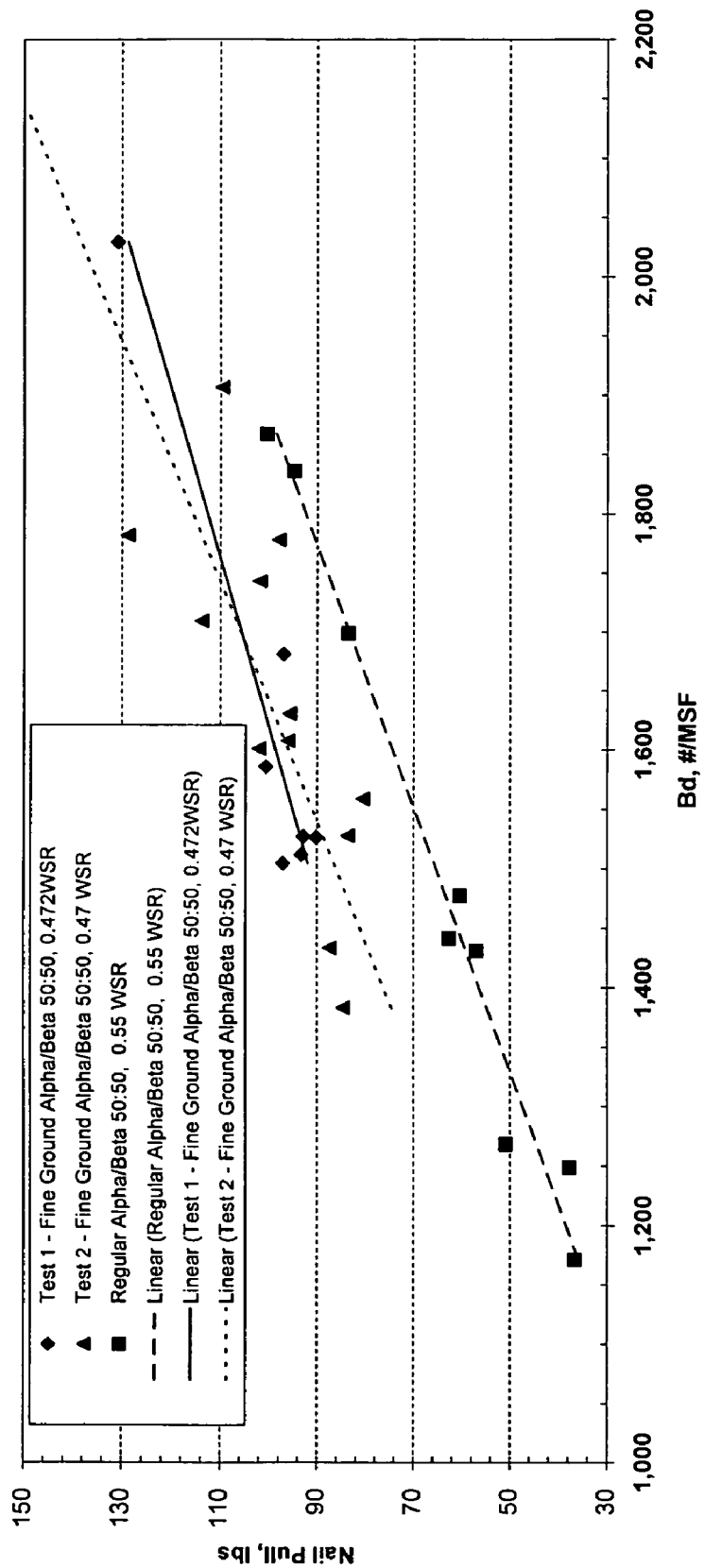
FIG. 6 is a graph depicting nail pull test data of boards made with a 50:50 (w/w) blend of fine ground alpha-hemihydrate and beta-hemihydrate in one embodiment of the present invention.

In order to demonstrate superior performance using the 50:50 (w/w) blend of fine ground alpha-hemihydrate and beta-hemihydrate, a naphthalenesulfonate dispersant, and a trimetaphosphate salt, board samples were prepared at 0.472 WSR. As shown in FIG. 6, boards made with the 50:50 (w/w) blend of fine ground alpha-hemihydrate and beta-hemihydrate, 1% by weight naphthalenesulfonate dispersant based on the weight of stucco, and 0.3% by weight trimetaphosphate salt based on the weight of stucco provided much better nail pull values than boards prepared using 50:50 (w/w) blends of regular (plant ground) alpha-hemihydrate and beta-hemihydrate (and the same additives) at 0.55 WSR. Two sets of test boards were prepared using the fine ground alpha-hemihydrate blend with beta-hemihydrate.

Nail pull resistance tests were performed according to ASTM C-473. Additionally, it is noted that typical gypsum wallboard is approximately ½ inch thick and has a weight of between about 1600 to 1800 pounds per 1,000 square feet of material, or lb/MSF. ("MSF" is a standard abbreviation in the art for a thousand square feet; it is an area measurement for boxes, corrugated media and wallboard.)

Example 7

Slurries Prepared Using 100% Fine Ground Alpha-Hemihydrate

Figure 7:
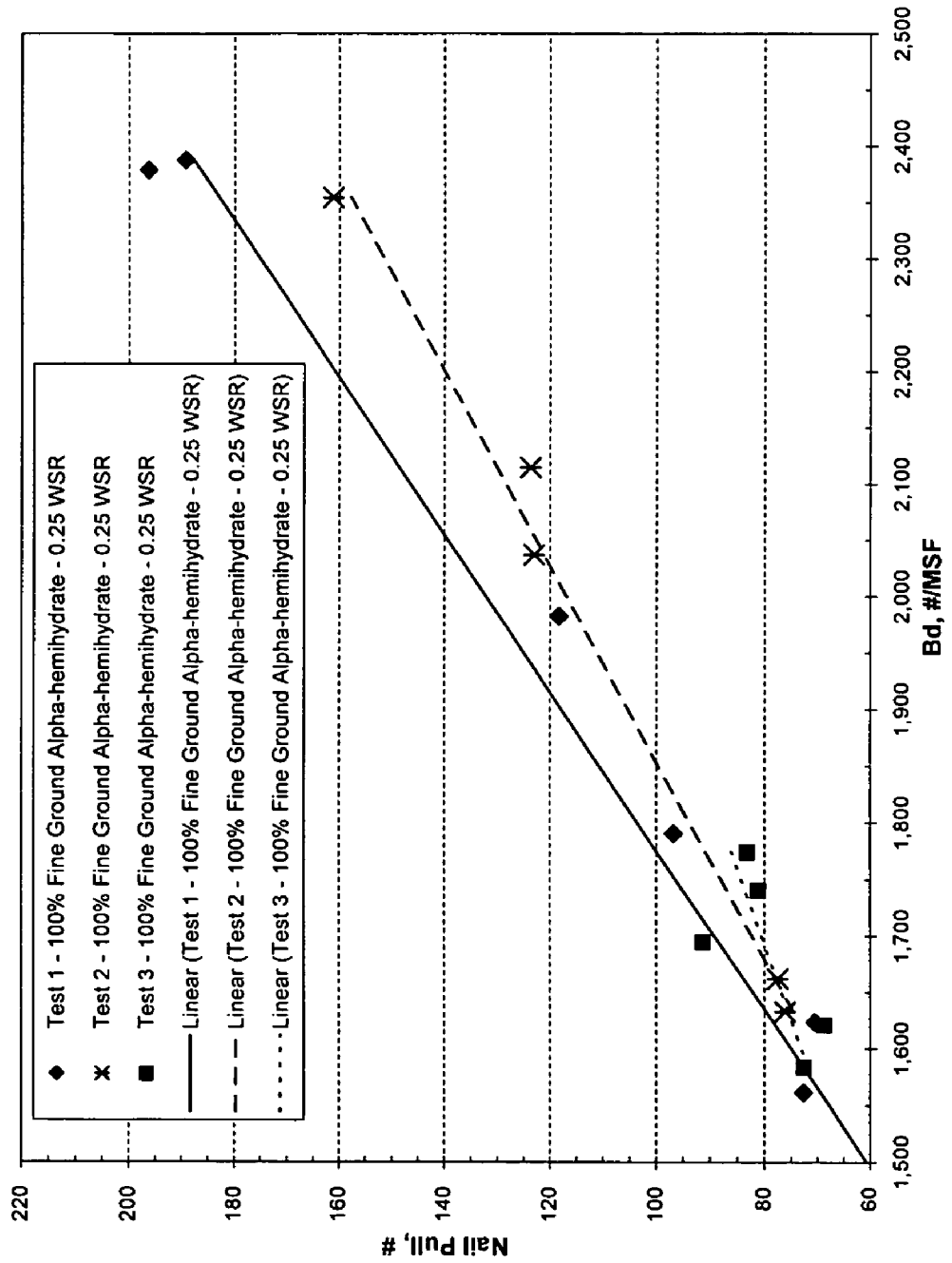
FIG. 7 is a graph depicting nail pull test data of wallboards made with 100% ground alpha-hemihydrate in accordance with one embodiment of the present invention.

If 100% fine ground alpha-hemihydrate, as prepared in Example 1, were used in slurry formulations, it is anticipated that a much lower water demand would result compared to slurries made using beta-hemihydrate. In addition, if 100% fine ground alpha-hemihydrate were used in slurry formulations including a trimetaphosphate salt and a naphthalenesulfonate dispersant, such as in Example 3 above, it is anticipated that water demand would decrease even further, that is, WSR in the range of about 0.2 to about 0.3. As shown in FIG. 7, wallboards made with 100% ground alpha-hemihydrate in accordance with the present invention provided excellent nail pull values that meet or exceed industry standards. Three sets of test boards were prepared using 100% ground alpha-hemihydrate.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A gypsum wallboard comprising:
    a set gypsum composition formed between two substantially parallel cover sheets, the set gypsum composition made using a gypsum-containing slurry comprising:
    water, and
    ground alpha-hemihydrate having a particle size distribution within the following range:
        d (0.1)=about 3μ-5μ,
        d (0.5)=about 14μ-50μ,
        d (0.9)=about 40μ-100μ,
    and a Blaine surface area in the range from about 3100 cm²/g to about 9000 cm²/g.

2. The gypsum wallboard of claim 1, wherein the ground alpha-hemihydrate has a particle size distribution within the following range:
    d (0.1)=about 3μ-5μ,
    d (0.5)=about 14μ-20μ,
    d (0.9)=about 40μ-50μ,
    and a Blaine surface area in the range from about 3500 cm²/g to about 6000 cm²/g.

3. The gypsum wallboard of claim 1, wherein the ground alpha-hemihydrate has a particle size distribution of d (0.1)=about 3μ, d (0.5)=about 14.1μ, d (0.9)=about 45.9μ, and a Blaine surface area of about 3900 cm²/g.

4. The gypsum wallboard of claim 1, wherein the gypsum-containing slurry further comprises sodium trimetaphosphate present in an amount of at least about 0.12% by weight based on the weight of alpha-hemihydrate, and a naphthalenesulfonate dispersant present in an amount from about 0.5% to about 2.5% by weight based on the weight of alpha-hemihydrate.

5. The gypsum wallboard of claim 4, wherein the gypsum-containing slurry further includes a starch.

6. The gypsum wallboard of claim 5, wherein the starch is pregelatinized corn starch present in an amount up to about 6% by weight based on the weight of alpha-hemihydrate.

7. The gypsum wallboard of claim 1, wherein the gypsum-containing slurry further comprises beta-hemihydrate.

8. The gypsum wallboard of claim 7, wherein the ratio of alpha-hemihydrate to beta-hemihydrate is about 50:50 (w/w).

9. The gypsum wallboard of claim 7, wherein the gypsum-containing slurry further comprises sodium trimetaphosphate present in an amount of at least about 0.12% by weight based on the total weight of alpha-hemihydrate and beta-hemihydrate, and a naphthalenesulfonate dispersant present in an amount from about 0.5% to about 2.5% by weight based on the total weight of alpha-hemihydrate and beta-hemihydrate.

10. The gypsum wallboard of claim 8, wherein the gypsum-containing slurry further comprises sodium trimetaphosphate present in an amount of at least about 0.12% by weight based on the total weight of alpha-hemihydrate and beta-hemihydrate, and a naphthalenesulfonate dispersant present in an amount from about 0.5% to about 2.5% by weight based on the total weight of alpha-hemihydrate and beta-hemihydrate.

11. The gypsum wallboard of claim 10, wherein the gypsum-containing slurry further includes a starch.

12. The gypsum wallboard of claim 11, wherein the starch is pregelatinized corn starch present in an amount up to about 6% by weight based on the total weight of alpha-hemihydrate and beta-hemihydrate.

13. The gypsum wallboard of claim 1, wherein the cover sheets comprise paper.

14. A gypsum-containing slurry comprising:
water, and
ground alpha-hemihydrate having a particle size distribution within the following range:
d (0.1)=about 3μ-5μ,
d (0.5)=about 14μ-50μ,
d (0.9)=about 40μ-100μ,
and a Blaine surface area in the range from about 3100 cm$^2$/g to about 9000 cm$^2$/g.

15. The gypsum-containing slurry of claim 14, wherein the ground alpha-hemihydrate has a particle size distribution within the following range:
d (0.1)=about 3μ-5μ,
d (0.5)=about 14μ-20μ,
d (0.9)=about 40μ-50μ,
and a Blaine surface area in the range from about 3500 cm$^2$/g to about 6000 cm$^2$/g.

16. The gypsum-containing slurry of claim 14, wherein the ground alpha-hemihydrate has a particle size distribution of d (0.1)=about 3μ, d (0.5)=about 14.1μ, d (0.9)=about 45.9μ, and a Blaine surface area of about 3900 cm$^2$/g.

17. The gypsum-containing slurry of claim 14, further comprising sodium trimetaphosphate present in an amount of at least about 0.12% by weight based on the weight of alpha-hemihydrate, and a naphthalenesulfonate dispersant present in an amount from about 0.5% to about 2.5% by weight based on the weight of alpha-hemihydrate.

18. The gypsum-containing slurry of claim 14, further comprising beta-hemihydrate.

19. A method of making gypsum wallboard, comprising the steps of:
(a) mixing a gypsum-containing slurry comprising
water, and
ground alpha-hemihydrate having a particle size distribution within the following range:
d (0.1)=about 3μ-5μ,
d (0.5)=about 14μ-50μ,
d (0.9)=about 40μ-100μ,
and a Blaine surface area in the range from about 3100 cm$^2$/g to about 9000 cm$^2$/g;
(b) depositing the gypsum-containing slurry on a first cover sheet;
(c) placing a second cover sheet over the deposited slurry to form a gypsum wallboard;
(d) cutting the gypsum wallboard after the gypsum-containing slurry has hardened sufficiently for cutting; and
(e) drying the gypsum wallboard.

20. The method of claim 19, wherein the ground alpha-hemihydrate has a particle size distribution within the following range:
d (0.1)=about 3μ-5μ,
d (0.5)=about 14μ-20μ,
d (0.9)=about 40μ-50μ,
and a Blaine surface area in the range from about 3500 cm$^2$/g to about 6000 cm$^2$/g.

21. The method of claim 19, wherein the ground alpha-hemihydrate has a particle size distribution of d (0.1)=about 3μ, d (0.5)=about 14.1μ, d (0.9)=about 45.9μ, and a Blaine surface area of about 3900 cm$^2$/g.

22. The method of claim 19, wherein the gypsum-containing slurry further comprises sodium trimetaphosphate present in an amount of at least about 0.12% by weight based on the weight of alpha-hemihydrate, and a naphthalenesulfonate dispersant present in an amount from about 0.5% to about 2.5% by weight based on the weight of alpha-hemihydrate.

23. The method of claim 19, wherein the gypsum-containing slurry further comprises beta-hemihydrate.

24. The method of claim 19, in which the first cover sheet and the second cover sheet are made of paper.

25. A gypsum wallboard consisting essentially of:
a set gypsum composition formed between two substantially parallel cover sheets, the set gypsum composition made using a gypsum-containing slurry of:
water, and
ground alpha-hemihydrate having a generally unimodal particle size distribution within the following range:
d (0.1)=about 3μ-5μ,
d (0.5)=about 14μ-50μ,
d (0.9)=about 40μ-100μ,
and a Blaine surface area in the range from about 3100 cm$^2$/g to about 9000 cm$^2$/g.

* * * * *